(12) United States Patent
Czeisler et al.

(10) Patent No.: US 8,341,531 B2
(45) Date of Patent: Dec. 25, 2012

(54) CONTENT FORMATTING AND INSTALLATION TECHNIQUES

(75) Inventors: Adam C. Czeisler, Seattle, WA (US); Jose J. Figueroa-Morales, Seattle, WA (US); Paul M. Paradise, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 947 days.

(21) Appl. No.: 11/069,814

(22) Filed: Feb. 28, 2005

(65) Prior Publication Data
US 2006/0069736 A1  Mar. 30, 2006

Related U.S. Application Data

(60) Provisional application No. 60/614,821, filed on Sep. 30, 2004.

(51) Int. Cl.
*G06F 3/00* (2006.01)
*G06F 3/01* (2006.01)
(52) U.S. Cl. ........ 715/748; 715/739; 715/741; 715/745; 715/753
(58) Field of Classification Search .................. 715/748, 715/731, 734, 736, 739, 741, 745, 753
See application file for complete search history.

(56) References Cited

U.S. PATENT DOCUMENTS

| | | | |
|---|---|---|---|
| 5,887,133 | A | 3/1999 | Brown et al. |
| 6,606,744 | B1 | 8/2003 | Mikurak |
| 6,691,162 | B1 * | 2/2004 | Wick ............................ 709/224 |
| 7,934,210 | B1 | 4/2011 | Stampfli et al. |
| 8,037,421 | B2 | 10/2011 | Scott et al. |
| 8,073,896 | B2 | 12/2011 | Huckins |
| 2003/0123465 | A1 | 7/2003 | Donahue |
| 2003/0225834 | A1 * | 12/2003 | Lee et al. ....................... 709/204 |
| 2004/0003390 | A1 | 1/2004 | Canter et al. |
| 2004/0177116 | A1 * | 9/2004 | McConn et al. .............. 709/204 |
| 2005/0165880 | A1 | 7/2005 | Moody et al. |
| 2005/0204309 | A1 * | 9/2005 | Szeto ............................ 715/811 |
| 2005/0256866 | A1 * | 11/2005 | Lu et al. ............................ 707/5 |
| 2005/0261970 | A1 * | 11/2005 | Vucina et al. ................... 705/16 |
| 2006/0031510 | A1 * | 2/2006 | Beck et al. ..................... 709/226 |
| 2006/0053279 | A1 * | 3/2006 | Coueignoux ................. 713/154 |
| 2007/0083827 | A1 | 4/2007 | Scott et al. |
| 2009/0300597 | A1 | 12/2009 | George et al. |
| 2010/0131895 | A1 | 5/2010 | Wohlert |
| 2010/0251230 | A1 | 9/2010 | O'Farrell et al. |

OTHER PUBLICATIONS

Non-Final Office Action for U.S. Appl. No. 11/068,235, mailed on Aug. 29, 2011, Adam C. Czeisler, "Content Formatting and Installation Techniques", 27 pgs.
"Eclipse Platform Technical Overview", Object Technology International Inc., Feb. 2003, Retrieved on Apr. 6, 2012 at <<http://www.eclipse.org/whitepapers/eclipse-overview.pdf>> pp. 1-20.
Ongtang, et al., "Porscha: Policy Oriented Secure Content Handling in Android", In the Proceedings of the 26th Annual Computer Security Applications Conference, Dec. 2010, pp. 221-230.

* cited by examiner

*Primary Examiner* — Nicholas Augustine
(74) *Attorney, Agent, or Firm* — Lee & Hayes, PLLC

(57) ABSTRACT

Content formatting and installation techniques are described. In an implementation, a method includes receiving one or more inputs for initiating an installation process of one or more content items and performing the installation process without user intervention. The performing of the installation process includes obtaining a content package, from over a network, which includes a manifest which describes a content type for each of the content items. Each of the content items is installed for use by an application module based on a respective content type.

16 Claims, 12 Drawing Sheets

CONTENT FORMATTING AND INSTALLATION TECHNIQUES

RELATED APPLICATION

The present application claims priority under 35 U.S.C. §119(e) to U.S. Provisional Patent Application No. 60/614,821, filed Sep. 30, 2004, the disclosure of which is hereby incorporated by reference in its entirety.

TECHNICAL FIELD

The present invention generally relates to the field of content and more particularly relates to systems, methods, apparatus, and computer-readable media for content formatting and installation techniques.

BACKGROUND

Users have access to a wide range of application modules that can provide a wide variety of functionality. For example, the user may utilize one or more application modules to play audio content, browse the Internet, instant message another user, send and receive email, take notes, draft a document, create a presentation, and so on. Thus, the user may interact with a wide variety of application modules during a given day.

To make interaction with the application modules more appealing, one or more of the application modules may be "personalized" by the user, such as by including content which is selected by the user for use during execution of the application module. For example, a user may choose a graphic for display in a background of a user interface, an emoticon for use in an instant messaging session, and so on. However, obtaining personalized content (i.e., the content selected by the user) for use by the application module and configuring the application module to use the content may be cumbersome. For example, multiple steps may be performed by a user to import a picture from a web site, such as by selecting and saving the picture from the web site, locating where the picture is saved, importing the picture into the application module, and so on. Additionally, the steps needed to be performed may be different for each type of application module available to the user. Further, the user may be exposed to "untrustworthy" content which may adversely affect the execution of the application module. Therefore, because of this complexity and the potential harm that may be caused, the user may often forgo adding personalized content altogether, thereby diminishing the user's experience with the application modules.

Therefore, there is a continuing need for techniques that may be employed for content formatting and installation.

SUMMARY

Content formatting and installation techniques are described. In an implementation, a method includes receiving one or more inputs for initiating an installation process of one or more content items and performing the installation process without user intervention. The performing of the installation process includes obtaining a content package, from over a network, which includes a manifest which describes a content type for each of the content items. Each of the content items is installed for use by an application module based on a respective content type.

In another implementation, a method includes initiating an installation process for installing content items on a client without user intervention. The initiating includes determining whether a content provider of the content items is trusted through comparison with a content provider list. If the content provider is trusted, a content package is obtained from over a network which includes the one or more content items and a manifest which describes a content type for each of the content items. Each of the content items is installed based on a respective said content type for use by an application module on the client.

BRIEF DESCRIPTION OF THE DRAWINGS

The same numbers are used in instances in the disclosure and figures to reference like components and features.

DETAILED DESCRIPTION

Overview

Figure 1:
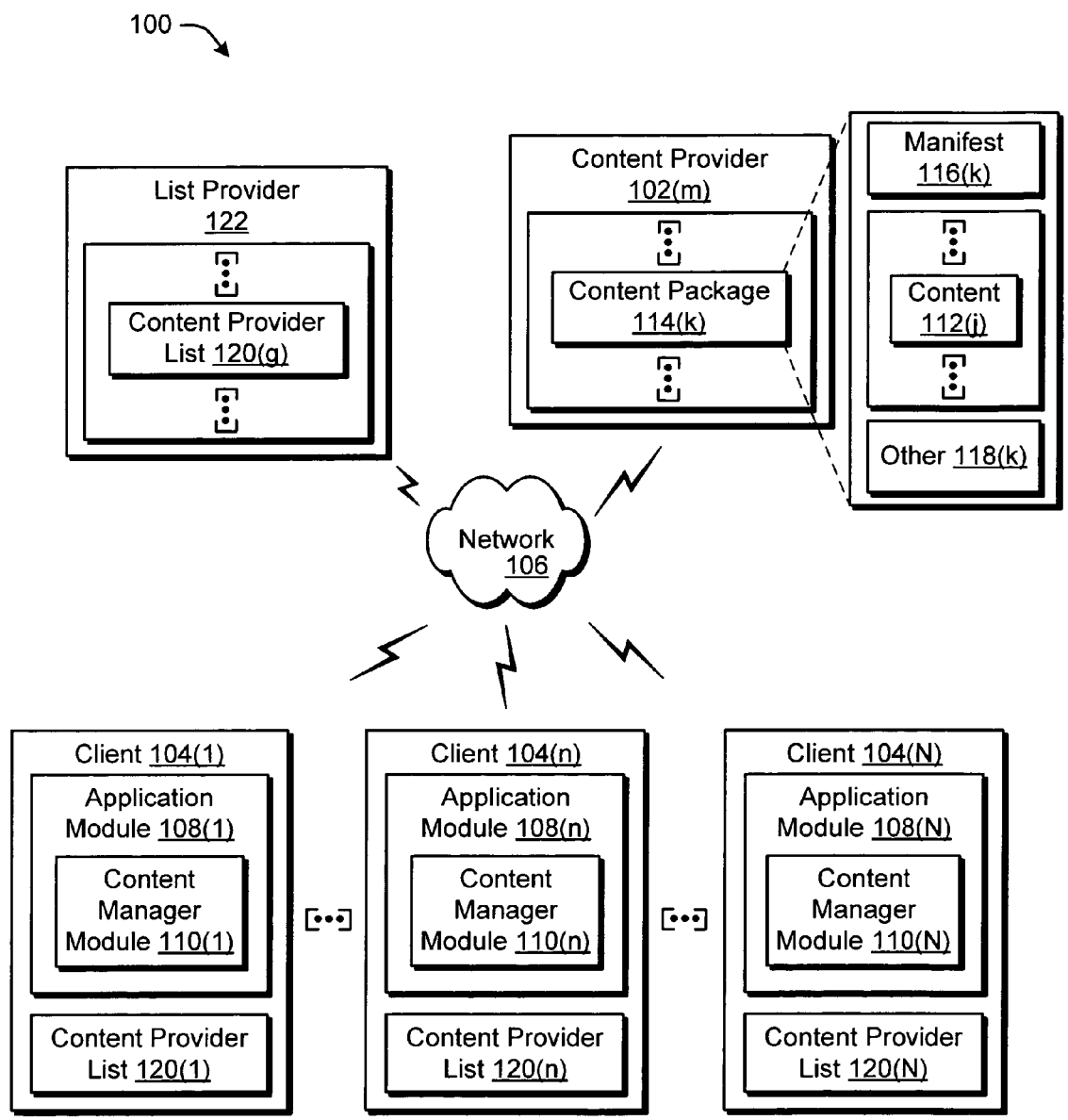
FIG. 1 is an illustration of an exemplary implementation showing an environment that is operable to employ the content formatting and installation techniques.

Content formatting and installation techniques are described. Users may desire to add a variety of content to "personalize" interaction with an application module. For instance, the application module may be configured as a messenger module that, when executed, provides an instant messaging session with another user. The messenger module may provide a variety of customization and personalization features, such as images that may be selected by the user for display during an instant messaging session. However, traditional processes utilized to install images may be cumbersome in that the processes may involve a great deal of user interaction. For example, a traditional technique utilized to import an image from a web site required the user to right-click the picture, save the image to a hard disk of a computing device, remember the location, select the messenger module, open a display image dialog box, select a "browse" button, browse to the correct location of the image on the hard disk, import the image, select the image, and then acknowledge that importation of the image is desired by selecting an "ok" button. Thus, this process may be so cumbersome that even a user that is "savvy" to the operation of the computing device may decide that it is not worth the perceived complications required by each manual step to install the content.

In an implementation, techniques are described which provide for installation of content into an application module, such as pictures, background images, emoticons (e.g., "smileys"), themes, and so on. The architecture may be configured in a variety of ways to provide this functionality. For example, the architecture may include two components that work together: (1) a standardized format for representing content which is referred to in the following discussion as a "content package"; and (2) a control which is installable as a part of the application module to install the represented content which is referred to in the following discussion as a "content manager module".

The content package may be utilized to provide a variety of functionality. For example, the content package may support arbitrary content types through use of multiple namespaces; may include different types of content for simultaneous installation from a single content package; may support nesting such that multiple content packages can be nested to support aggregation of content; and so on. Further discussion of the generation of a content package and installation of content from the content package may be found in relation to FIGS. 3, 4 and 7.

The content manager module may also be utilized to provide a wide variety of functionality. For example, the content manager module may be executed to install content directly from a link on a webpage into an application module that is being executed without further interaction from a user. For instance, a content provider may purchase rights to "skin" clients with a particular theme for a period of time. Therefore, each client which logs on to the content manager module during that period of time may be "skinned" with the particular theme, such as wallpaper, emoticons, and so on. Thus, the content manager module may provide a revenue stream by selling installation rights to this content. Additionally, the content manager module may limit which content may be obtained for installation in the application module through use of a content provider list which references "trusted" content providers. Further discussion of management of the content provider list and an installation process that is performed utilized the content provider list may be found in relation to FIGS. 5, 6 and 7.

The architecture may be implemented for use in a variety of environments, an example of which is an instant messaging environment. The architecture in this example provides an infrastructure to enable efficient download and importation of content for use during an instant messaging session. For example, the architecture may support installation of a content package which may include an individual image, a plurality of content items, or even another content package. The architecture may also provide an extensible design to support new content types without requiring update of the content manager module itself, provide digital rights management (DRM), and may be optimized to reduce the amount of interaction (e.g., number of "clicks") which are performed by the user to complete the installation.

A user, for example, may sign onto an instant messenger service and see a promotion for a theme, e.g., a new movie release. The user may then "click" a link which causes content that is configured to reflect the theme (e.g., pictures of actors, scenes, and so on) to be automatically installed without further user intervention, further discussion of which may be found in relation to FIG. 4. In another example, a user may participate in an instant messaging session, open a dropdown menu, and select a link to obtain additional content (e.g., emoticons) which are downloaded automatically in response to selection of the link. In a further example, a user may browse to a web site, notice a particular image, and select (i.e., "click") a link to download and import the particular image.

By providing an efficient technique to install content, users are more likely to avail themselves of personalized content, thereby providing a large potential market for the sale and distribution of content by content providers. For instance, provision of personalized content may be monetized, such as by downloading themes from a content provider relating to an upcoming movie. Although this architecture is described in relation to an instant messaging environment, this architecture may be employed in a wide variety of other environments without departing from the spirit and scope thereof, further discussion of which may be found in relation to FIG. 1. In the following discussion, an exemplary environment which is operable to employ the content formatting and installation techniques is described. Exemplary procedures are then described which may be implemented in the exemplary environment, as well as in a variety of other environments.

Exemplary Environment

FIG. 1 is an illustration of an exemplary implementation showing an environment 100 that is operable to employ the content formatting and installation techniques. The environment 100 includes a plurality content providers 102(*m*) (where "m" can be any integer from one to "M") that are communicatively coupled to a plurality of clients 104(1), . . . , 104(*n*), . . . , 104(N) over a network 106. The clients 104(1)-104(N) may be configured in a variety of ways for accessing the network 106. For example, one or more of the clients 104(1)-104(N) may be configured as a computing device, such as a desktop computer, a mobile station, an entertainment appliance, a set-top box communicatively coupled to a display device, a wireless phone, a game console, and so forth. Thus, the clients 104(1)-104(N) may range from full resource devices with substantial memory and processor resources (e.g., personal computers, game consoles) to low-resource devices with limited memory and/or processing resources (e.g., traditional set-top boxes, hand-held game consoles). The clients 104(1)-104(N) may also relate to a person and/or entity that operate the clients. In other words, one or more of the clients 104(1)-104(N) may describe logical clients that include users, software, and/or devices.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks. For instance, client 104(1) and client 104(N) may be communicatively coupled, one to another, via a peer-to-peer network. Additionally, each of the plurality of clients 104(1)-104(N) may be communicatively coupled to the content provider **102(*m*)** over the Internet. A wide variety of other instances are also contemplated.

Each of the plurality of clients **104(1), 104(*n*), 104(N) is illustrated as including a respective one of a plurality of application modules 108(1), 108(*n*), 108(N). The application modules 108(1)-108(N) may be configured in a variety of ways. For example, one or more of the application modules 108(1)-108(N) may be configured to provide functionality directly to a user, such as to play audio content, instant message another user, send and receive email, take notes, generate a document (e.g., a word processor) or a spreadsheet, create a presentation, browse the Internet, and so on. Additionally, one or more of the application modules 108(1)-108(N) may be configured to provide content for another client, such as a web application that is executed on one client (e.g., client 104(1)) to provide content to another client (e.g., client 104(N)). Further, one or more of the application modules 108(1)-108 (N) may be configured to provide a software "infrastructure" of the clients 104(1), such as an operating system Each application module 108(1), 108(*n*), 108(N) is also illustrated as including a respective content manager module 110(1), 110(*n*), 110(N). The content manager modules 110 (1)-110(N) are executable to provide a bridge between the content provider 102(*m*) and the respective application module 108(1)-108(N). For example, the content manager module 110(*n*) may be installed with the application module 108(*n*) and instantiated by the content providers 102(*m*). Additionally, the content manager module 110(*n*) may support a method (which may be referred to as "InstallContent") which communicates with the application module 108(*n*). The content manager module 110(*n*), for instance, communicates a uniform resource locator (URL) to the application module 108(*n*) to download one or more of a plurality of content 112(*j*), where "j" can be any integer from one to "J". The application module 108(1) is executable to download content from the URL, parse the content, and install each item of content for utilization by the application module 108(*n*)**.

The plurality of content **112(*j*) may be configured in a variety of ways for communication to the clients 104(1)-104 (N). For example, one or more items of content 112(*j*) may be formatted in one of a plurality of content packages 114(*k*), where "k" can be any integer from one to "K". Each content package 114(*k*) includes a manifest 116(*k*) which describes content that is available in that content package 114(*k*), (e.g., such as metadata associated with individual files in the content package 114(*k*), metadata associated with a plurality of files in the content package 114(*k*), and so on), as well as other 118(*k*) information. The content package 114(*k*) may employ a namespace to reference different content types. Additionally, the namespace employed by the content package 114(*k*) may be extended, such as to include future content types. Content 112(*j*) included in the content package 114(*k*) may be formatted as one or more files, which may be self-describing or "point to" another resource. Further discussion of exemplary formatting which may be employed for the content package 114(*k*)** may be found in relation to FIG. 2.

To protect against the use of "untrustworthy" content by the clients 104(1)-104(N), each client **104(1), 104(*n*), 104(N) may include a respective one of a plurality of content provider lists 120(1), 120(*n*), 120(N). Content provider list 120(*n*), for example, may describe whether one or more of the plurality of content providers 102(*m*) is "trusted". Therefore, the client 104(*n*), through use of the content provider list 120(*n*), may determine whether desired content is from a trusted source. For example, the application module 108(*n*) may compare a URL of a content provider 102(*m*) selected by a user with the content provider list 120(*n*) to determine if the content provider 102(*m*) is trustworthy. If so, the application module 108(*n*) may be executed to obtain the content 112(*j*), such as one or more content packages 114(*k*) and/or content that is not formatted in a content package 114(*k*)**.

The content provider lists 120(1)-120(N) may be obtained in a variety of different ways. For example, client **104(*n*) may generate the content provider list 120(*n*) based on observed interaction of the client 104(*n*) with the plurality of content providers 102(*m*). In another example, the content provider list 120(*n*) may be communicated from a list provider 122. The list provider 122, for instance, may be accessible over the network 106 and function as a centralized repository for the plurality of content provider lists 120(*g*), where "g" can be any integer from one to "G". Therefore, the list provider 122 may dynamically update the content provider lists 120(*g*) and communicate a result of this update to the plurality of clients 104(1)-104(N)**.

Additionally, although each of the plurality of content provider lists 120(1)-120(N) is illustrated as stored locally on a respective one of the plurality of clients 104(1)-104(N), the content provider lists 120(1)-120(N) may be maintained on the list provider 122. For instance, the client **104(*n*) may communicate a request to the list provider 122 which includes a URL of the content provider 102(*m*), from which, the client 104(*n*) wishes to obtain content. The list provider 122 may then process the request utilizing the plurality of content provider lists 120(*g*) and return a result to the client 104(*n*) which indicates whether the content provider 102(*m*) is "trusted". It should be noted that by maintaining a list of acceptable content providers separately (e.g., either locally on the client 104(*n*) and/or remotely on the list provider 122), the content provider lists 120(1)-120(N) may be updated without interfering with the content manager modules 110 (1)-110(N) or the application modules 108(1)-108(N)** themselves.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the formatting and installation techniques described below are platform-independent, meaning that the techniques may be implemented on a variety of commercial computing platforms having a variety of processors.

Figure 2:
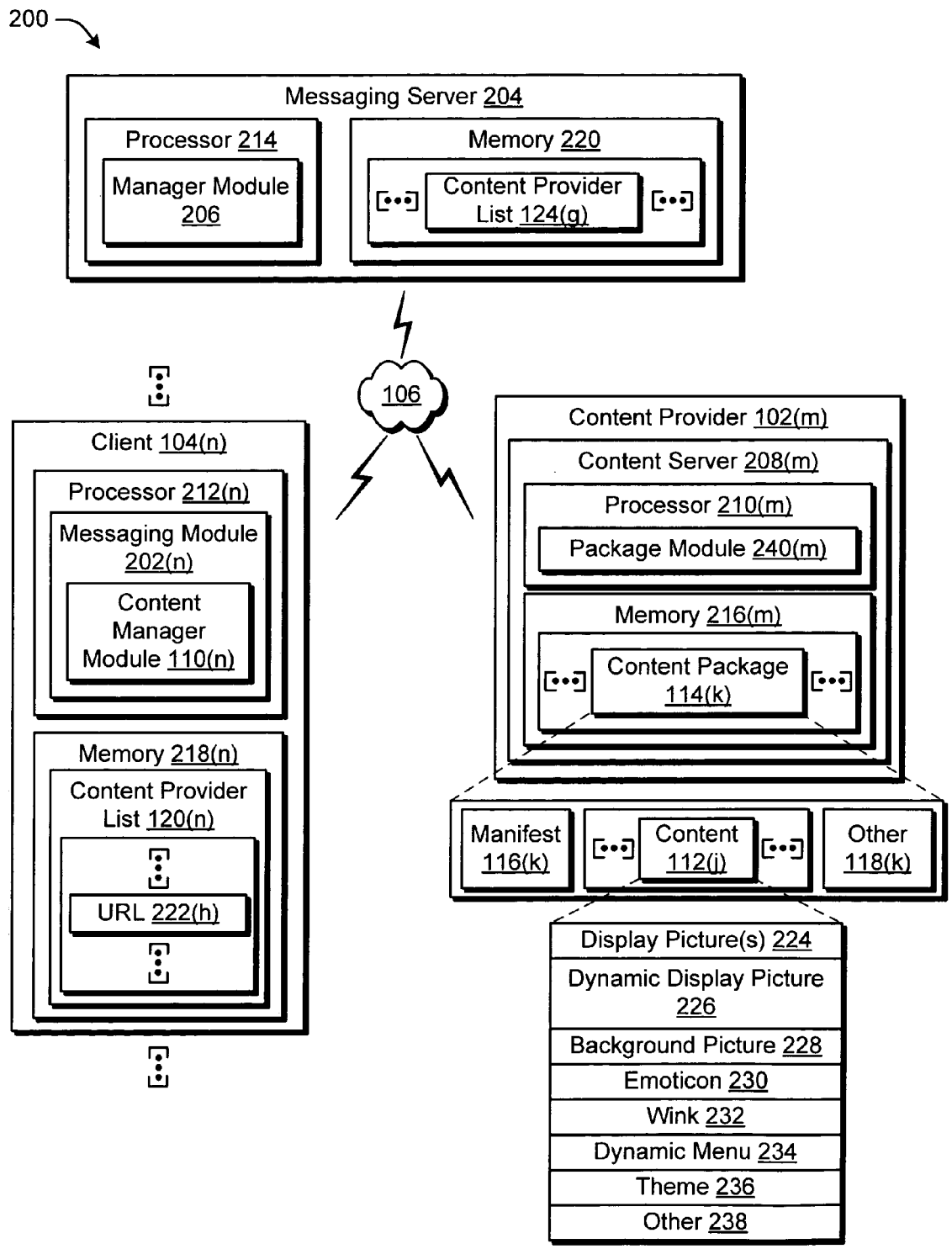
FIG. 2 is an illustration of an exemplary implementation of a system showing a client and a content provider of FIG. 1 as utilized in an instant messaging environment.

FIG. 2 is an illustration of an exemplary implementation of a system 200 showing the client **104(*n*) and the content provider 102(*m*) of FIG. 1 as utilized in an instant messaging environment. Instant messaging provides a mechanism such that each of the plurality of clients 104(*n*), when participating in an instant messaging session, may send text messages, one to another. The instant messages are typically communicated in real time, although delayed delivery may also be utilized, such as by logging the text messages when one of the clients 104(*n*)** is unavailable, e.g., offline. Thus, instant messaging may be thought of as a combination of e-mail and Internet chat in that instant messaging supports message exchange and is designed for two-way live chats. Therefore, instant messaging may be utilized for synchronous communication.

For instance, like a voice telephone call, an instant messaging session may be performed in real-time such that each user may respond to each other user as the instant messages are received.

In the illustrated system 200, the plurality of application modules 108(n) of FIG. 1 are configured as a plurality of messaging modules 202(n). The messaging modules 110(1)-110(N) are executable to communicate with each other through use of a messaging server 204. The messaging server 204, for instance, may include a messaging manager module 206 (hereinafter "manager module") which is executable thereon to route instant messages between the messaging modules 202(n). For instance, the client 104(n) may execute the messaging module 202(n) to form an instant message for communication to another client 104(1) of FIG. 1. The messaging module 202(n) is executed to communicate the instant message to the messaging server 204, which then executes the manager module 206 to route the instant message to the client 104(1) over the network 106. The client 104(1) receives the instant message and executes a corresponding messaging module (e.g., application module 108(1) configured as a messaging module) to display the instant message. In another instance, when the clients 104(1), 104(n) are communicatively coupled directly, one to another (e.g., via a peer-to-peer network), the instant messages are communicated without utilizing the messaging server 204.

The client 104(n), content provider 102(m), and the messaging server 204 are each illustrated as being implemented by a respective computing device. For example, content provider 102(m) is illustrated as implemented via a content server 208(m) and the client 104(n) is illustrated as a client device. The content server 208(m), the client 104(n), and the messaging server 204 each include a respective processor 210(m), 212(n), 214 and a respective memory 216(m), 218(n), 220. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 216(m), 218(n), 220 is shown, respectively, for the content server 208(m), the client 104(n), and the messaging server 204, a wide variety of types and combinations of memory may be employed, such as random access memory (RAM), hard disk memory, removable medium memory, and so forth.

The messaging module 202(n) is illustrated as including the content manager module 110(n). The content manager module 110(n) may be implemented in a variety of ways. For example, the content manager module 110(n) may be configured as an "ActiveX control" that can be accessed from a web site of the content provider 102(m). An ActiveX control is a software component based on a component object model (COM) and is configured for reuse by different application modules. The ActiveX control may be created in a variety of programming languages, such as Visual Basic, Visual C++, Java, and so on. Therefore, a content provider 102(m) which desires use of the content manager module 110(n) to install content on the client 104(n) may instantiate the control to be able to call methods exposed by the control. The content manager module 110(n) may expose a variety of methods, examples of which are discussed below.

HRESULT InstallContent([in] BSTR bstrURL)

This function may be called to download the content package 114(k) from a URL specified in the "bstrURL" parameter. The content manager module 110(n) may initiate an HTTP download to the given URL, and once the download has completed, the content package 114(k) may be unpacked and installed, further discussion of which may be found in relation to FIGS. 3 and 4.

HRESULT InstallContentItem([in] BSTR bstrXMLDerscription)

This function may install a single piece of content in the messaging module 202(n). The "bstrXMLDescription" may contain a piece of XML that describes the item, including the URL from which the content may be downloaded. The content manager module 110(n) may parse the XML, download the item and install it. In an implementation, the content file is not a content package 114(k) file, but the exact file type for the given content type (e.g., for backgrounds it may be an image file).

Event: void OnContentInstalled([in] long hrResult)

This event may be executed when content has been downloaded and installed. The "hrResult" indicates if the download/install was successful. Various error codes may be defined to identify different error cases.

The control (i.e., the content manager module 110(n)) may be instantiated in a variety of ways. For example, a web site may include an object tag in the body as follows:

```
<OBJECT id="MessengerContentInstaller" height="0" width="0"
    classid="clsid:F06608C7-1874-4EEA-B3B2-DF99EBB144B8"
    codeType="application/x-oleobject" VIEWASTEXT>
</OBJECT>
```

The web site may also include the following function:

```
<script language="jscript">
    function InstallContent( strURL )
    {
        MessengerContentInstaller.InstallContent(strURL);
    }
</script>
```

The download link on the web page may then call the function listed below and pass in the URL for the content or the content package 114(k).

```
<A href="javascript:InstallContent('http://[domainname]/[name of content file].CAB')">
```

Thus, it should be noted that the content manager module 110(n) may obtain the content package 114(k) and/or content 112(j) that is not included in a content package 114(k).

In an implementation, the instantiation of the content manager module 110(n) is limited to "trustworthy" content providers 102(m). To enforce this, the content provider list 120(n) may include a list of a plurality of URLs 222(h), where "h" can be any integer from one to "H". For example, when the content manager module 110(n) is loaded (e.g., in a browser), it may identify the URL of the content provider 102(m) and send the identified URL to the messaging module 202(n) for validation. In this implementation, if the content manager module 110(n) is not instantiated for a valid URL, the application programming interface (API) methods of the content manager module 110(n) are disabled. For example, a valid URL may be defined as coming from the same domain. For instance, to install content from "www.example.com", the client may check to see if "http://www.example.com/" is included on the "allow" list. A variety of other examples are also contemplated, such as digitally signed content based on a certification path, use of certificates, and so on.

As previously described, the content may be configured in a variety of ways, one of which is the content package 114(k). One example of a content package 114(k) may be implemented utilizing a "cabinet" (CAB) format, which is supported by Windows platforms and provides an efficient way to form a single file from a group of files. The content package 114(k) may include the plurality of content 112(j) and the manifest 116(k) which describes properties of the content 112(j). The manifest 116(k) may be configured in a variety of ways, such as an XML file which conforms to a schema/format of having a <package> root tag with zero or more <item> tags inside it. The XML format is advantageous in that it is extensible and allows different attributes to be specified for different content types. Additionally, XML parsers and validation tools are available on a variety of operating system platforms. A particular file extension may be utilized to identify the content package 114(k) such that the purpose of the content package 114(k) is readily identifiable and may be registered, such as to allow the content package 114(k) to be "double clicked" for opening.

The <item> tags of the manifest 116(k) may be configured in a variety of ways. For example, each <item> tag may contain: (1) a "type" attribute, which specifies a content type; (2) a "mimetype" attribute, which specifies a multipurpose internet mail extension (MIME) type of the item to distinguish between content types that can have more than one MIME type, (e.g., JPEG images vs. PNG images); and (3) a file attribute, which specifies a name of a related file for an item stored within the content package 114(k). Some <item> and <package> tags may contain more than this base data. Therefore, XML namespaces may be utilized to extend the basic schema. For example, an emoticon namespace may extend the base namespace to support a display name of an emoticon, a key sequence to cause the emoticon to be sent, as well as a namespace prefix to resolve ambiguities with other emoticons.

Additionally, some <item> tags may point to another content package 114(k) nested within the content package. This may be used for dynamic display pictures and winks (which are described in greater detail later in the discussion), which may both use the content package 114(k) format themselves to include their content. For example, a wink may be formatted as a content package which includes a flash animation, a thumbnail, and metadata. More than one wink content package may then be embedded in another content package (e.g., to form a content package having emoticons which correspond to a particular theme), thereby allowing the client 104(n) to install more than one wink using a single content package.

The content package 114(k) that is downloaded from the content provider 102(m) may contain binaries of the content 112(j) as well as the manifest 116(k) configured as an XML file for describing the content 112(j). The following sections describe in greater detail exemplary information which may be included in the content package 114(k), and the behavior of the messaging module 202(n) once installation of the content 112(j) has been completed. It should be noted that some content types, e.g. display pictures, can have an image specified as a "default". If default is equal to "true" for more than one image, the last one in the list is utilized. Further discussion of "default" content may be found in relation to the following section.

Display Picture 224

A display picture 224 may be utilized as a graphical representation (e.g., an image) of the client 104(n) in an instant messaging session, and is commonly referred to as an "avatar". When downloading a single image or a pack of images, each image may be checked until one of them which has been marked as the "default" image is found. If so, this marked image may become the client's 104(n) display picture for use during an instant messaging session. If no image has been specified, all images may be downloaded, with the "last" image being specified as the avatar.

In an implementation, if the client 104(n) has not selected an option in the messaging module 202(n) which specifies that the display picture 224 is to be output, the messaging module 202(n) may be reconfigured automatically to select the option. The assumption in this implementation is that when the client 104(n) navigates to a web site to download display pictures 224, it is likely that the client 104(n) wants to use them. The same behavior may apply if the display picture is part of a theme as described below. An example of XML content for the display picture 224 is as follows:

```
<?xml version="1.0" encoding="UTF-8"?>
<package xmlns="http://messenger.msn.com/messengercontent/1.0"
version="1.0" type="theme" partnerid="CP">
    <item xmlns:usertile=http://messenger.msn.com/usertile/1.0
    contenttype="P" contentid="AG34567"usertile:version="1.0"
    type="usertile" mimetype="image/png" file="usertile.png"
    usertile:default="true" usertile:displayname="Paul Joe" />
</package>
```

Dynamic Display Picture 226

Dynamic display pictures may also be used as an "avatar". However, in this instance the display picture is dynamic (e.g., animated), such as to indicate a change in mood depending on what text is entered on the client 104(n). Since a dynamic display picture includes multiple elements, the dynamic display picture may be shipped as a content package. If the dynamic display picture is included as a part of a "theme", it may be transferred as a content package nested inside of another content package. The following is exemplary XML content having separate files for different moods:

```
<?xml version="1.0" encoding="UTF-8"?>
<package xmlns="http://messenger.msn.com/messengercontent/1.0"
version="1.0" type="dynamicpicture"
xmlns:dynamicpicture="http://mssenger.msn.com/dynamicpicture/1.0"
dynamicpicture:version="1.0" dynamicpicture:displayname="Black Cat"
partnerid="CP">
    <item type="downlevel" mimetype="image/png"
    file="blackcat.png" />
    <item dynamicpicture:default="true" type="mood"
    mimetype="application/x-shockwave-flash" file="happycat.swf"
    dynamicpicture:name="Happy" dynamicpicture:emoticon=":)"
    contenttype="P" />
    <item type="mood" mimetype="application/x-shockwave-flash"
    file="sadcat.swf" dynamicpicture:name ="Sad"
    dynamicpicture:keysequence=":(" dynamicpicture:keysequence2=":-
    (" contenttype="P" />
</package>
```

The following is another exemplary XML content with a single flash file having parameters for providing different moods:

```
<?xml version="1.0" encoding="UTF-8"?>
<package xmlns="http://messenger.msn.com/messengercontent/1.0"
version="1.0" type="dynamicpicture"
xmlns:dynamicpicture="http://mssenger.msn.com/dynamicpicture/1.0"
dynamicpicture:version="1.0" dynamicpicture:displayname="Black Cat"
partnerid="CP">
    <item type="downlevel" mimetype="image/png"
        file="blackcat.png" />
    <item dynamicpicture:default="true" type="mood"
        mimetype="application/x-shockwave-flash" file="cat.swf"
        dynamicpicture:parameter="happymoodparameter"
        dynamicpicture:name="Happy" dynamicpicture:emoticon=":)"
        contenttype="P" />
    <item type="mood" mimetype="application/x-shockwave-flash"
        file="cat.swf" parameter="happymoodparameter"
        dynamicpicture:name ="Sad" dynamicpicture:keysequence=":("
        dynamicpicture:keysequence2=":-(" contenttype="P" />
</package>
```

Background Pictures 228

Background pictures 228 may be utilized in a background of a user interface provided by the messaging module 202(n). For background pictures, there is existing client functionality that may be considered, examples of which are described as follows:

Has the default background already been overwritten by the client? If so, does this setting need to be honored or is it permissible to perform an overwrite?

Does the client have backgrounds set for certain users on their contact list? If so, should the current background be kept or should the setting be overwritten?

Does the user even have a set background?

Since it may not be intuitive as to how to change a default background in the messaging module 202(n), this setting may be configured such that it is not overwritten. If the client 104(n) downloads a background image from a web site, for instance, it may be added to a list of background images. If the image is downloaded via the dropdown menus, it may be applied to the window, from which, download was initiated. Exemplary XML content for a background picture is as follows:

```
<?xml version="1.0" encoding="UTF-8"?>
<package xmlns="http://messenger.msn.com/messengercontent/1.0"
version="1.0"
type="theme" partnerid="CP">
    <!-- Background -->
    <item
    xmlns:background="http://messenger.msn.com/background/1.0"
    contentid="AG45678" contenttype="P" background:version="1.0"
    type="background" mimetype="image/jpg"
    file="zebra_MANIA.jpg" background:displayname="Zebra
    MANIA" />
    <!-- Background -->
    <item
    xmlns:background="http://messenger.msn.com/background/1.0"
    contentid="AG74523" contenttype="P" background:version="1.0"
    type="background" mimetype="image/jpg" file="island.jpg"
    background:displayname="Pacific Island" background:text="Click
    here to win a trip to Hawaii"
    background:url="http://www.3dparty.com/backpromo.htm"
    background:imptrackurl="http://server/track"/>
</package>
```

Emoticon 230

Similar to the other content types, emoticons (e.g., also known as "smileys", an example of which is represented between the following quotes ":)") can be downloaded and imported into the messaging module 202(n). In an implementation, the content provider 102(m) may specify shortcuts for each emoticon in the content and/or the content metadata, such as to type ":)" to output a graphic of a smiley face. In a scenario in which there is a conflict, such as when a content provider 102(m) specifies a shortcut that is already used by the client 104(n), a new shortcut is automatically generated. A dialog box may be utilized to modify keyboard shortcuts to be more meaningful to the user. An example of sample XML content for an emoticon is as follows:

```
<?xml version="1.0" encoding="UTF-8"?>
<package xmlns="http://messenger.msn.com/messengercontent/1.0"
version="1.0"
type="theme" partnerid="CP">
    <item contentid="AG43987" contenttype="P"
    xmlns:emoticon="http://messenger.msn.com/emoticon/1.0"
    type="emoticon" emoticon: namespaceprefix ="coke"
    mimetype="image/gif" file="emoticon2.gif"
    emoticon:displayname="Red Heart" emoticon:keysequence="(L)"/>
</package>
```

Wink 232

A wink 232 may be considered a "full-screen" emoticon which may include a display of motion. In an implementation, a default wink is not provided. Since the wink 232 may include multiple elements, each wink may be formatted as a content package. Therefore, if the wink is included in a content package 114(k) (e.g. a theme), the wink may be included as a content package that is nested within another content package. An example of exemplary XML content of a wink is as follows:

```
<?xml version="1.0" encoding="UTF-8"?>
<package xmlns="http://messenger.msn.com/messengercontent/1.0"
version="1.0"
    type="wink" xmlns:wink="http://messenger.msn.com/winks/1.0"
    wink:version="1.0" partnerid="CP">
    <item contentid="AG45099" type="animation"
    mimetype="application/x-shockwave-flash" file="heartkey.swf"
    wink:sizex="200" wink:sizey="200" contenttype="P" />
    <item type="thumbnail" mimetype="image/png"
file="beerchug.jpg"
    contenttype="P" />
</package>
```

Dynamic Menu 234

Content menus provided by the messaging module 202(n) may be configured to show dynamic content. For instance, content for display of a dynamic menu may include an image, a "click through" URL, a description of the menu item, and so on. Following is an exemplary schema for a dynamic menu item:

```
<?xml version="1.0" encoding="UTF-8" ?>
<msnmenuitem version="1.0">
    <thumburl>http://server/image_thumb.gif</thumburl>
    <displaytext>Tool tip</displaytext>
    <clickurl>http://server</clickurl>
    <clicktrackurl>http://server/track.gif</clicktrackurl>
    <siteid>12365</siteid>
</msnmenuitem>
```

Theme 236

A theme 236 may be configured a collection of some or all of the individual content items listed above, as well as other 238 content items. For example, a theme XML file may be configured to include display pictures, a wink, a background, a dynamic display picture, and a plurality of emoticons as follows:

```
<?xml version="1.0" encoding="UTF-8"?>
<package xmlns="http://messenger.msn.com/messengercontent/1.0"
version="1.0" type="theme" partnerid="CP">
<!-- Wink stored in a separate CAB file -->
<item contentid="AG12365" type="content" contenttype="P"
mimetype="application/messengercontent" file="wink.mct" />
<!-- Usertile -->
<item xmlns:usertile="http://messenger.msn.com/usertile/1.0"
contenttype="P" contentid="AG34567"usertile:version="1.0"
type="usertile" mimetype="image/png" file="usertile.png"
usertile:default="true" usertile:displayname="Paul Joe" />
<!-- Usertile -->
<item xmlns:usertile="http://messenger.msn.com/usertile/1.0"
contentid="AG09876" contenttype="P" usertile:version="1.0"
type="usertile" mimetype="image/jpg" file="usertile2.jpg"
usertile:displayname="Paul WeeMee" />
<!-- Background -->
<item xmlns:background="http://messenger.msn.com/background/1.0"
contentid="AG45678" contenttype="P" background:version="1.0"
type="background" mimetype="image/jpg" file="zebra_MANIA.jpg"
background:displayname="Zebra MANIA" />
<!-- Background -->
<item xmlns:background="http://messenger.msn.com/background/1.0"
contentid="AG74523" contenttype="P" background:version="1.0"
type="background" mimetype="image/jpg" file="island.jpg"
background:displayname="Pacific Island" background:alttext="Click here
to win a trip to Hawaii"
background:alturl="http://www.3dparty.com/backpromo.htm" />
<!-Dynamic Display Picture - stored in a separate CAB file -->
<item contentid="AG98712" contenttype="P" type="messengercontent"
mimetype="application/messengercontent"
file="dynamicdisplaypic.mct"/>
<!-Emoticon -->
<item contentid="AG34567" contenttype="P"
xmlns:emoticon="http://messenger.msn.com/emoticon/1.0"
type="emoticon" emoticon:namespaceprefix="coke"
mimetype="image/png" file="emoticon1.png"
emoticon:displayname="Smiley" emoticon:keysequence=":)"/>
<!-Emoticon -->
<item contentid="AG43987" contenttype="P"
xmlns:emoticon="http://messenger.msn.com/emoticon/1.0"
type="emoticon" emoticon: namespaceprefix ="coke"
mimetype="image/gif" file="emoticon2.gif" emoticon:displayname="Red
Heart" emoticon:keysequence="(L)"/>
</package>
```

Other 238

A variety of other content may also be included in the content package 114(k). For example, the content package 114(k) may include another content package as previously described. Additionally, other audio and/or video content may also be included.

Descriptions of various tags that may be utilized in the XML schema for the content package are described in the following table. The XML tags may be encoded according to the 8-bit Unicode Transformation Format (UTF-8) specification.

XML Description

| XML tags | Attributes | Description |
| --- | --- | --- |
| Package | Version | Version of the content package. Package version can change in the future when new item types are added. |
| | xmlns | XML name space, contains the name space name and the schema version number at the end of the string. This allows the XML schema to be changed for future version of messaging module without affecting older clients. |
| | type | The type describes the content the XML represents. This is used to identify the installer of a given content type. This also allows new types to be added in the future without changing the XML schema. |
| | partnerid | String value that represents the parent identification. This may be set by the content provider. |
| Item | xmlns | XML name space contains the name space name and the schema version number at the end of the string. This allows the XML schema to be changed for future version of messenger without affecting older messaging modules. The name space also allows new attributes and elements to be added that are specific to the given namespace |
| | type | The type describes the content the XML represents. This is used to identify the installer of a given content type. This also allows new types to be added in the future without changing the XML schema. |
| | mimetype | Describes a file type, such as image, text, flash, and so forth. |
| | File | File name in the content package for the given content item |
| | contentid | A unique identifier for the given content item. This is set by the content creator and may be used for tracking. It may also be used to upsell premium content to users that see the content being used by their friends. This attribute is optional. |
| | contenttype | Identify the content. In an implementation, it can have three possible values: M = Merchant, P = Premium, D = Default. This value is optional, if it is not there, Messenger may treat the content as the Merchant type. |

The following table describes exemplary "type" XML descriptions for content.

| Type | Attributes | Description |
| --- | --- | --- |
| Usertile | default | Out of a collection of usertiles, this one may be set as the user's display picture |
| | displayname | Name used in the display picture dialog box to describe the image |
| Background | displayname | Name used in the Backgrounds dialog box to describe the image. This text is also used in the emoticons menu item tooltip |
| | url | Click through URL to be displayed on the ad section of the messaging module user interface (UI). In an implementation, this only applies to merchant content |
| | text | Text to be display on the ad section of the UI of the messaging module. In an implementation, this only applies to merchant content |
| | imptrackurl | impression track url, this URL may be hit every time a UI with this background is opened. |
| Emoticon | resolvetext | The collision resolution string, basically is a string the provider set to prefix the emoticon string in the case the user already is using the same emoticon string. If after appending the resolution string there is still a collision, an increasing number may be appended until the collision is resolved. |
| | displayname | This is the name used in the emoticons dialog box to describe the image. This text is also used in the emoticons menu item tooltip. In an implementation, this attribute is optional |

-continued

| Type | Attributes | Description |
|---|---|---|
| | keysequence | Sequence of characters that resolve into the given emoticon image when typed in the UI |
| Content | | No attributes. This type represents a theme content package. This type can be used by a content provider to include a theme content package within a theme content package. |
| wink | | No attributes. This type represents a wink content package. |
| Animation | Sizex | Wink width |
| | SizeY | Wink height |
| Thumbnail Downlevel | | |
| Mood | Name | Mood name |
| | keysequence | emoticon string that triggers the given mood change |

The following table describes exemplary "package" descriptions which may be utilized.

| Package | Attributes | Description | Valid types |
|---|---|---|---|
| theme | | Same as Package | usertile, background, emoticon, content |
| Wink | | Same as Package | animation, thumbnail downlevel, mood |
| dynamicpicture | displayname | Name used to display the dynamicpicture in the display picture dialog box | |

The application module 108(n) may also incorporate digital rights management (DRM) functionality, such as to prevent unauthorized reuse of content. For example, the application module 108(n) may store the content 112(j) in memory 218(n) of the client 104(n) such that it is not easily identified. This can be accomplished by using an object store of the messaging module 202(n). For instance, content 112(j) may be stored in a hidden folder on the client 104(n), may be stored with a different name and file extension (e.g., "familypicture.png" may become "TRF2FA.dat"), the stored file name may be a U.S. Secure Hash Algorithm Version 1.0 hash value of the original file name, and so on. In another instance, certain functionality may be disabled for purchased content. In a further technique, additional information may be added to the object store name which may indicate if a feature has been successfully purchased. This information can be used to disable certain functionality, e.g. right-clicking on a received emoticon that the sender has purchased may not show a "copy emoticon" menu entry.

Exemplary Procedures

The following discussion describes formatting and installation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
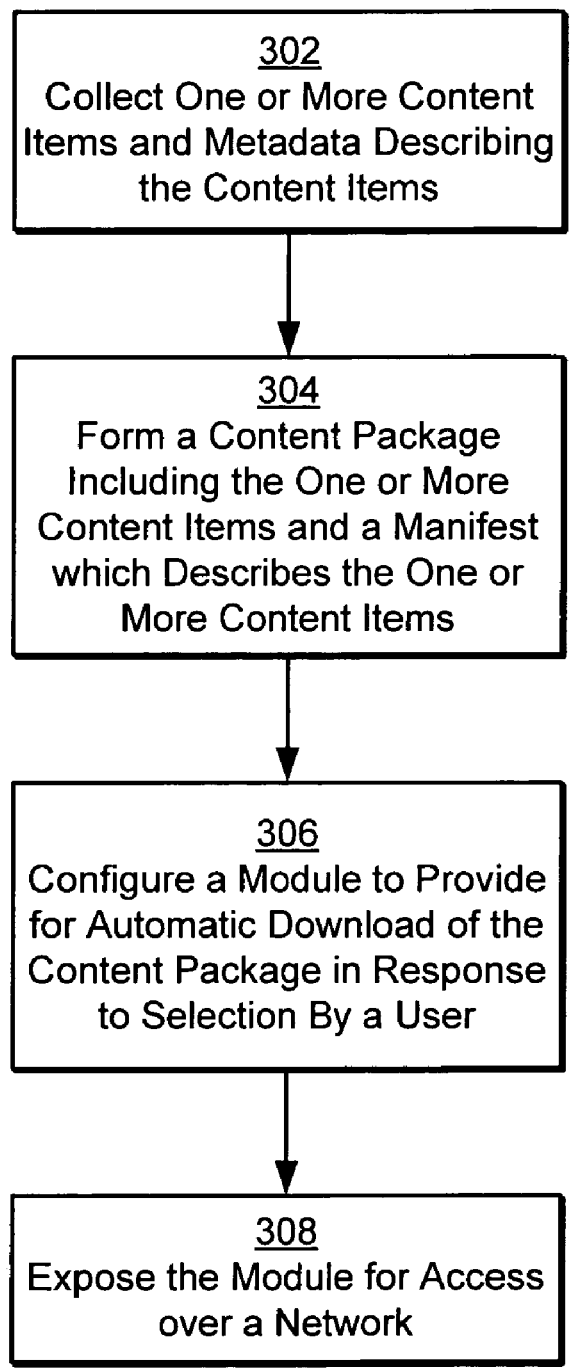
FIG. 3 is a flow diagram depicting a procedure 300 in an exemplary implementation in which content items are managed by a content provider for automatic download over a network.

FIG. 3 is a flow diagram depicting a procedure 300 in an exemplary implementation in which content items are managed by a content provider for automatic download over a network. The content provider 102(m) collects one or more content items 112(j) and metadata describing the content items 112(j) (block 302). For example, the content provider may collect an image to be used in an emoticon and metadata which describes a keystroke which is to be utilized to cause the image to be output, such as in an email, in conjunction with an instant messaging session, and so on. A variety of other content items may also be collected, such as display pictures, dynamic display pictures, background pictures, winks, themes, audio data, video data, and so on.

The content provider 102(m) then forms a content package to include the one or more content items and a manifest which describes the one or more content items (block 304). For example, the content package may conform to a schema/format of having a <package> root tag with zero or more <item> tags inside it in an XML file, which is extensible and therefore allows different attributes to be specified for different content types. The manifest may mimic this XML format, and therefore also have a <package> root tag with zero or more <item> tags inside it which correspond to the tags of the content package format. For example, as previously described, each <item> tag may contain: (1) a "type" attribute, which specifies a content type; (2) a "mimetype" attribute, which specifies a multipurpose internet mail extension (MIME) type of the item; and (3) a file attribute, which specifies a name of a related file for an item stored within the content package 114(k). Further, some <item> tags may point to another content package nested within the content package. The content may be stored in the content package in a variety of ways, such as binaries and so on.

A module is configured to provide for automatic download of the content package in response to selection by a user (block 306). For example, the content provider 102(m) may configure the package module 240(m) to call methods exposed on the content manager module 110(n) for installation of the content package 114(k) on the client 104(n) for use by the application module 108(n) (e.g., the messaging module 202(n)). The content provider 102(m), for instance, instantiates the content manager module 110(n) to call methods exposed by the content manager module 110(n). The content manager module 110(n)) may be instantiated in a variety of ways. As previously described, a web site of the content provider 102(m) may include an object tag in the body as follows:

```
<OBJECT id="MessengerContentInstaller" height="0" width="0"
    classid="clsid:F06608C7-1874-4EEA-B3B2-DF99EBB144B8"
    codeType="application/x-oleobject" VIEWASTEXT>
</OBJECT>
```

The web site may also include the following function:

```
<script language="jscript">
    function InstallContent( strURL )
    {
        MessengerContentInstaller.InstallContent(strURL);
    }
</script>
```

A download link on the web page may then call the function listed below and pass a URL for the content or the content package 114(k).

```
<A href="javascript:InstallContent('http://[domainname]/[name of content file].CAB')">
```

The package module 240(*m*) may also be configured in a variety of other ways to provide for automatic download of the content package.

The module is then exposed for access over a network (block 308). For example, a web page having the download link may be made available via a web site for access by the client 104(*n*) over the network 106. Therefore, the client 104(*n*) may then interact with the content provider 102(*m*) to automatically install the content package 114(*k*), further discussion of which may be found in relation to the following figure.

Figure 4:
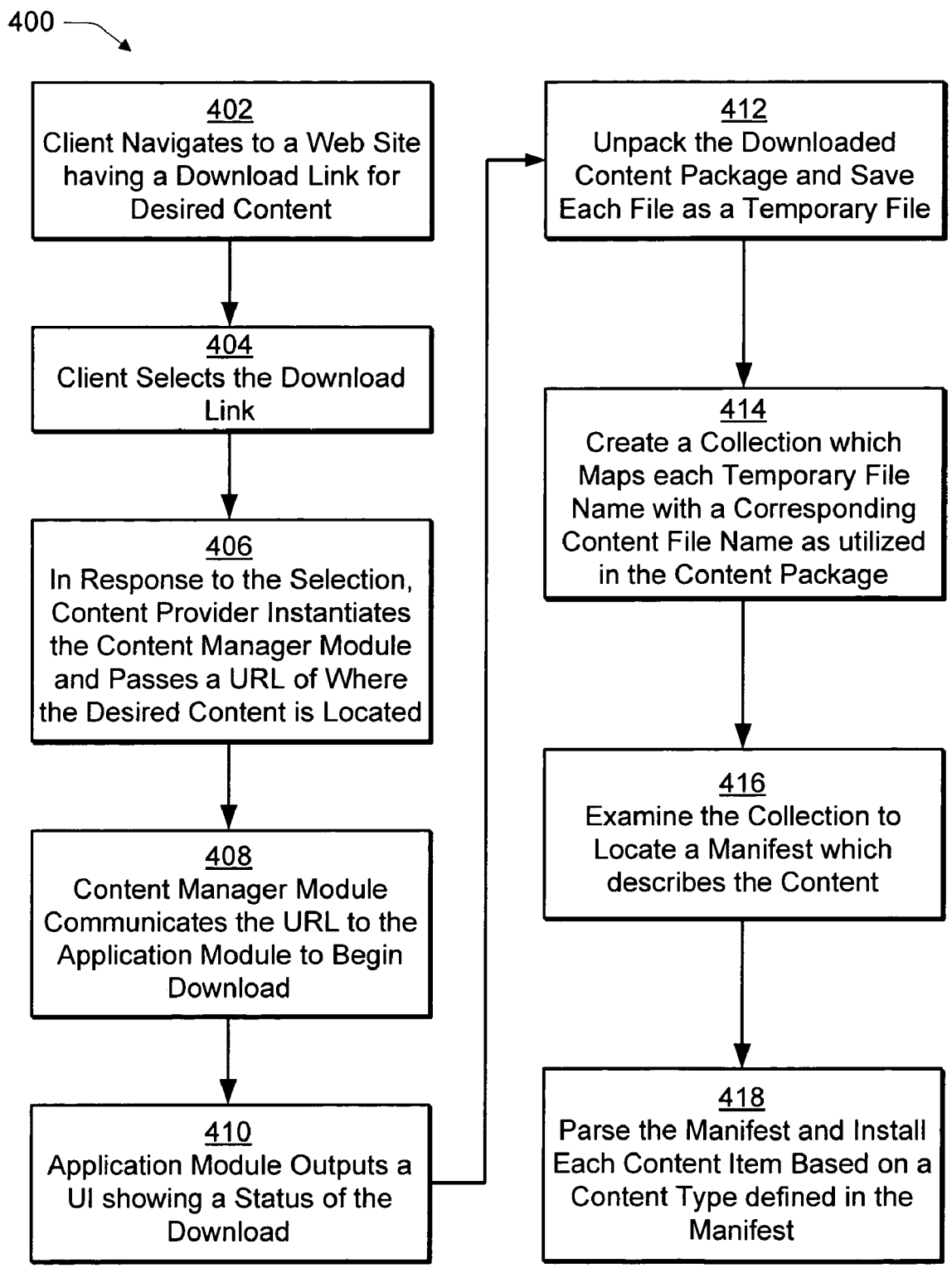
FIG. 4 is a flow diagram depicting a procedure in an exemplary implementation in which a content package formed by the procedure of FIG. 3 is automatically installed on the client device of FIG. 2.

FIG. 4 is a flow diagram depicting a procedure 400 in an exemplary implementation in which the content package 114(*k*) formed by the procedure 300 of FIG. 3 is automatically installed on the client 104(*n*) of FIG. 2. A client navigates to a web site having a download link for desired content (block 402) and selects the download link (block 404). For example, the client 104(*n*) may execute a browser to navigate to the web site and view a web page which describes content that is available and a link for downloading the content. The client 104(*n*) (i.e., a user of a client device) may then select the link to initiate installation of the content without further manual interaction by a user of the client.

In response to the selection, for instance, the content provider 102(*m*) instantiates the content manager module and passes a URL of where the desired content is located (block 406). For example, the content manager module 110(*n*) may be configured as an ActiveX control, which is software component based on a component object model (COM) and is configured for reuse by different application modules.

The content manager module 110(*n*) communicates the URL to the application module to begin download (block 408). In this implementation, the content manager module 110(*n*) is located within the application module 108(*n*), and relies on the application module 108(*n*) to perform the download. In another implementation, however, the content manager module 110(*n*) may be configured as a "stand-alone" module that is separate from the application module 108(*n*) and is configured to install content for the application module 110(*n*).

During the download, the application module output a UI showing a status of the download (block 410). The UI, for instance, may include a status bar which indicates a relative amount of the content package that is downloaded and remains to be downloaded, an estimated time to perform the download, and so on. The downloaded content package is then unpacked, and each file located in the content package is saved as a corresponding temporary file (block 412). A collection is then created which maps a temporary file name with a corresponding content file name as utilized in the content package (block 414). The collection is then examined to locate a manifest 116(*k*) which describes the content 112(*j*) (block 416). For example, each manifest 116(*k*) may be given a universal name to ease location.

The manifest is then parsed and each content item is installed based on a content type defined in the manifest (block 418). For example, as previously described the content package may comply with an XML schema which utilizes a tag to identify each content item included in the content package. Therefore, the tags may be utilized to identify the content type, and accordingly where and how the content item should be written to memory of the client for use by the application module. Once installed, the application module may utilize the content as intended. In this way, the procedure 400 of FIG. 4 describes an exemplary implementation in which content is automatically installed for use by an application module in response to a single "click" performed by a user of the client 104(*n*), without requiring further interaction by the user beyond the initial selection. In another exemplary procedure, a confirmation may be output before installation is begun. For example, the confirmation may be output to comply with ad policies that prevent downloading and installing content directly from an ad. Thus, in this instance selection of the confirmation provides the automatic installation.

Figure 5:
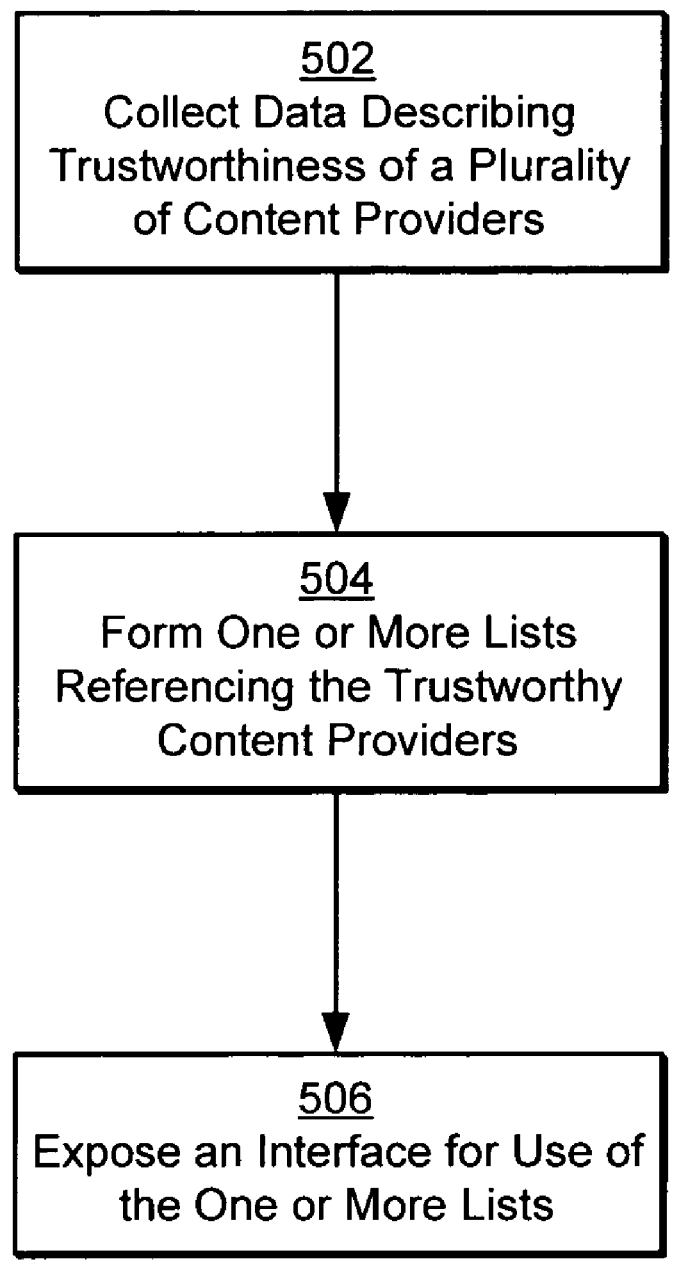
FIG. 5 is a flow diagram depicting a procedure in an exemplary implementation in which management of content provider lists is shown.

FIG. 5 is a flow diagram depicting a procedure 500 in an exemplary implementation in which management of content provider lists is shown. Data is collected which describes trustworthiness of a plurality of content providers (block 502). For example, the data may be collected from a reputation based system which receives feedback from clients regarding interaction with the content providers. In another example, the data may be obtained by the list provider 122. For instance, the list provider 122 may "screen" the plurality of content providers 102(*m*) and generate data which describes which content providers are trustworthy or untrustworthy. In a further example, the list provider 122 may include content providers for a fee. For instance, the list provider 122 may enter into contractual relationships with the content provider 102(*m*) for output of their content 112(*j*) in conjunction with the execution of the application module 108(*n*), such as backgrounds showing scenes of an upcoming movie release, advertisements, and so on.

One or more lists referencing the trustworthy content providers are then formed (block 504) from the collected data. For example, the content provider list 120(*n*) may be formed as a collection of URLs 222(*h*) of trustworthy content providers 102(*m*).

An interface is exposed for use of the one or more lists (block 506). For example, the list provider 122 may process requests from the application module 108(*n*) for determining whether the content provider 102(*m*) is trustworthy. In another example, the list provider 122 may provide an application programming interface (API) for retrieval of the content provider list 120(*g*) by the client 104(*n*), an example of which is described in greater detail in relation to the following figure.

Figure 6:
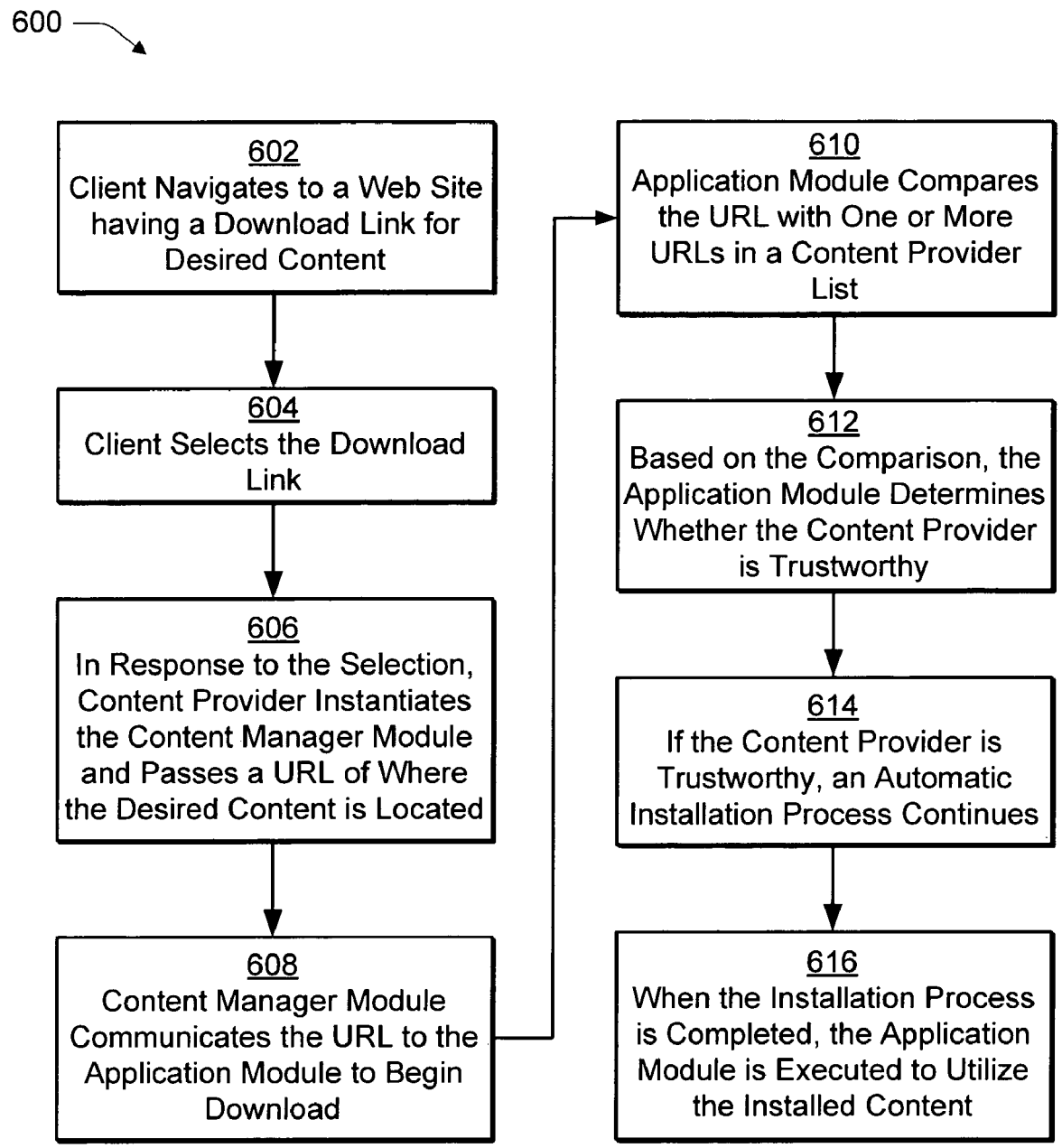
FIG. 6 is a flow diagram depicting a procedure in an exemplary implementation in which a content provider list obtained from the procedure of FIG. 5 is utilized during an automatic installation process to determine whether content to be received from a particular content provider is trustworthy.

FIG. 6 is a flow diagram depicting a procedure 600 in an exemplary implementation in which a content provider list obtained from the procedure 500 of FIG. 5 is utilized during an automatic installation process to determine whether content to be received from a particular content provider is trustworthy. As before, a client navigates to a web site having a download link for desired content (block 602) and selects the download link (block 604).

In response to the selection, the content provider instantiates the content manager module and passes a URL of where the desired content is located (block 606). The content manager module communicates the URL to the application module to begin download (block 608). Before beginning the download, the application module compares the URL with one with one or more URLs in a content provider list (block 610). Based on the comparison (block 610), the application module determines whether the content provider is trustworthy (block 612). If the content provider is trustworthy, the automatic installation process continues (block 614). For example, the procedure 400 of FIG. 4 may be performed. Once the installation process is completed, the application module is executed to utilize the installed content (block 616).

Figure 7:
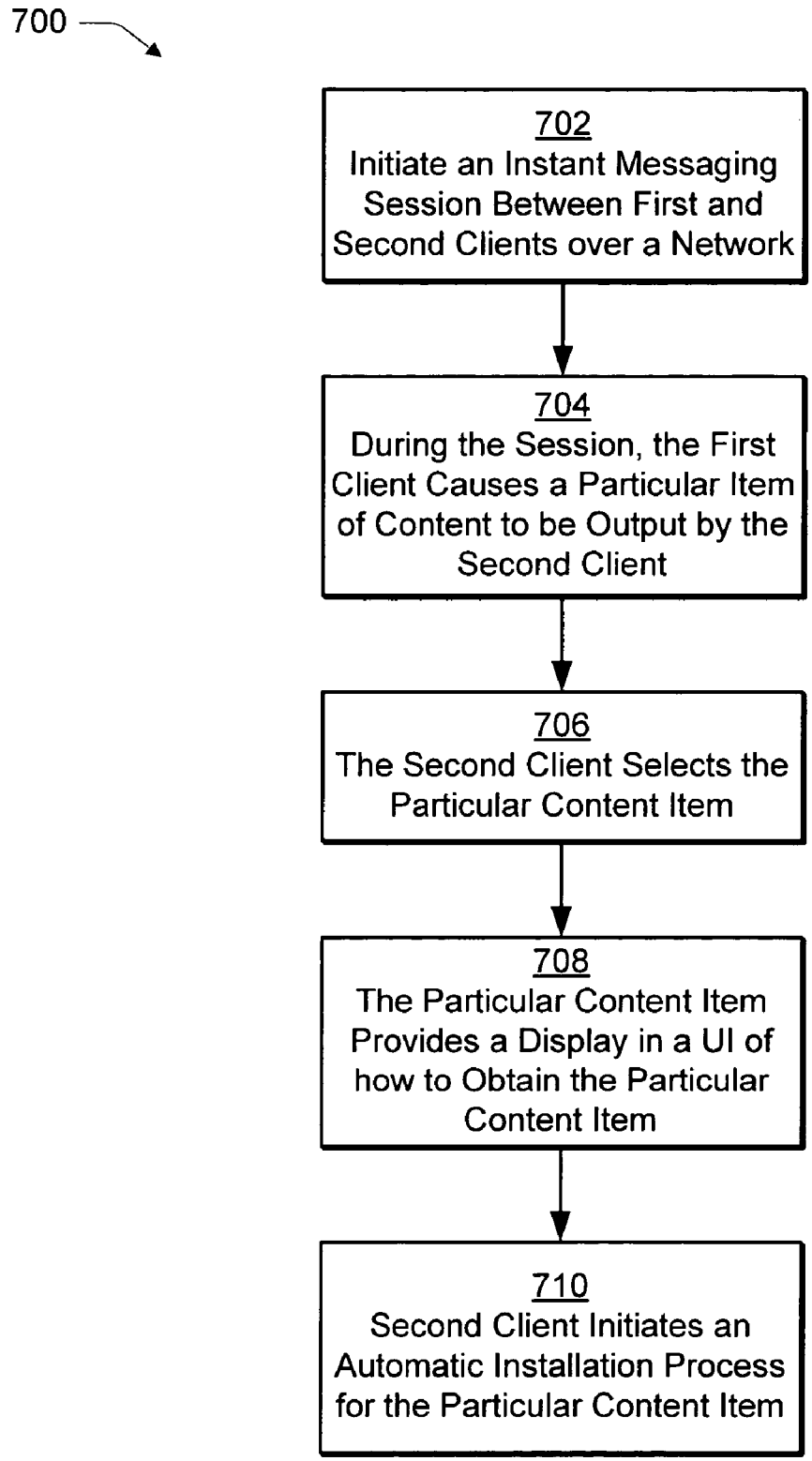
FIG. 7 is a flow diagram depicting a procedure in an exemplary implementation in which a content item is communicated during an instant messaging session and is selectable to cause automatic installation of the content item.

FIG. 7 is a flow diagram depicting a procedure 700 in an exemplary implementation in which a content item is communicated during an instant messaging session and is selectable to cause automatic installation of the content item. In the following discussion, referenced will be made to the procedure 700 of FIG. 7 and exemplary systems 800-1200 of respective FIGS. 8-12 which illustrate portions of the procedure 700.

Figure 8:
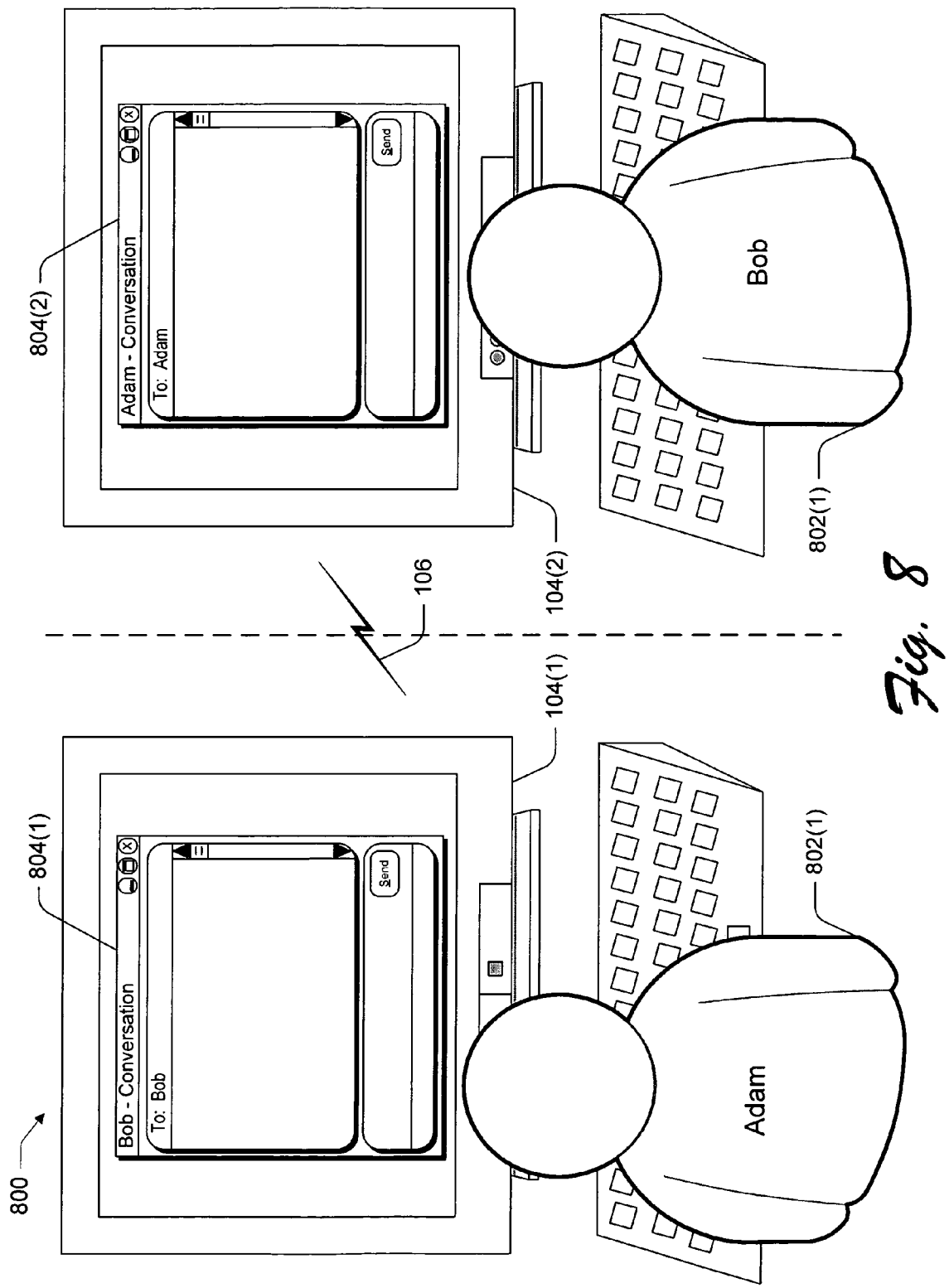
FIG. 8 is an illustration of a system which includes first and second clients of FIG. 2 as participating in an instant messaging session over a network.

An instant messaging session is initiated between first and second clients over a network (block 702). FIG. 8, for instance, is an illustration of a system 800 which includes a first client (illustrated as client 104(1)) and a second client (illustrated as client 104(2)) which participate in an instant messaging session over a network 106. The first client 104(1) is illustrated as being utilized by a first user 802(1) having the name "Adam" and the second client 104(2) is illustrated as being utilized by a second user 802(2) having the name "Bob". Text associated with instant messaging session is rendered for viewing by the first user 802(1) in a first user interface 804(1) through use of the corresponding client 104(1). Similarly, text associated with instant messaging session is rendered for viewing by the second user 802(2) in the second user interface 804(2) through use of the corresponding second client 104(2). Parentheticals in the reference numbers of FIGS. 8-12 are utilized to depict correlations, such as between the first client 104(1), the first user 802(1), and the first user interface 804(1).

Messages that are exchanged are transmitted between the first client 104(1) and the second client 104(2) via the network 106, which as previously stated may be implemented over the Internet, a peer-to-peer network connection, and so on. Although FIG. 8 is illustrated and described in relation to a plurality of users 802(1), 802(2) participating in an instant messaging session, it is recognized that the techniques described herein may also be applied to scenarios in which three or more users are participating in an instant messaging session.

Figure 9:
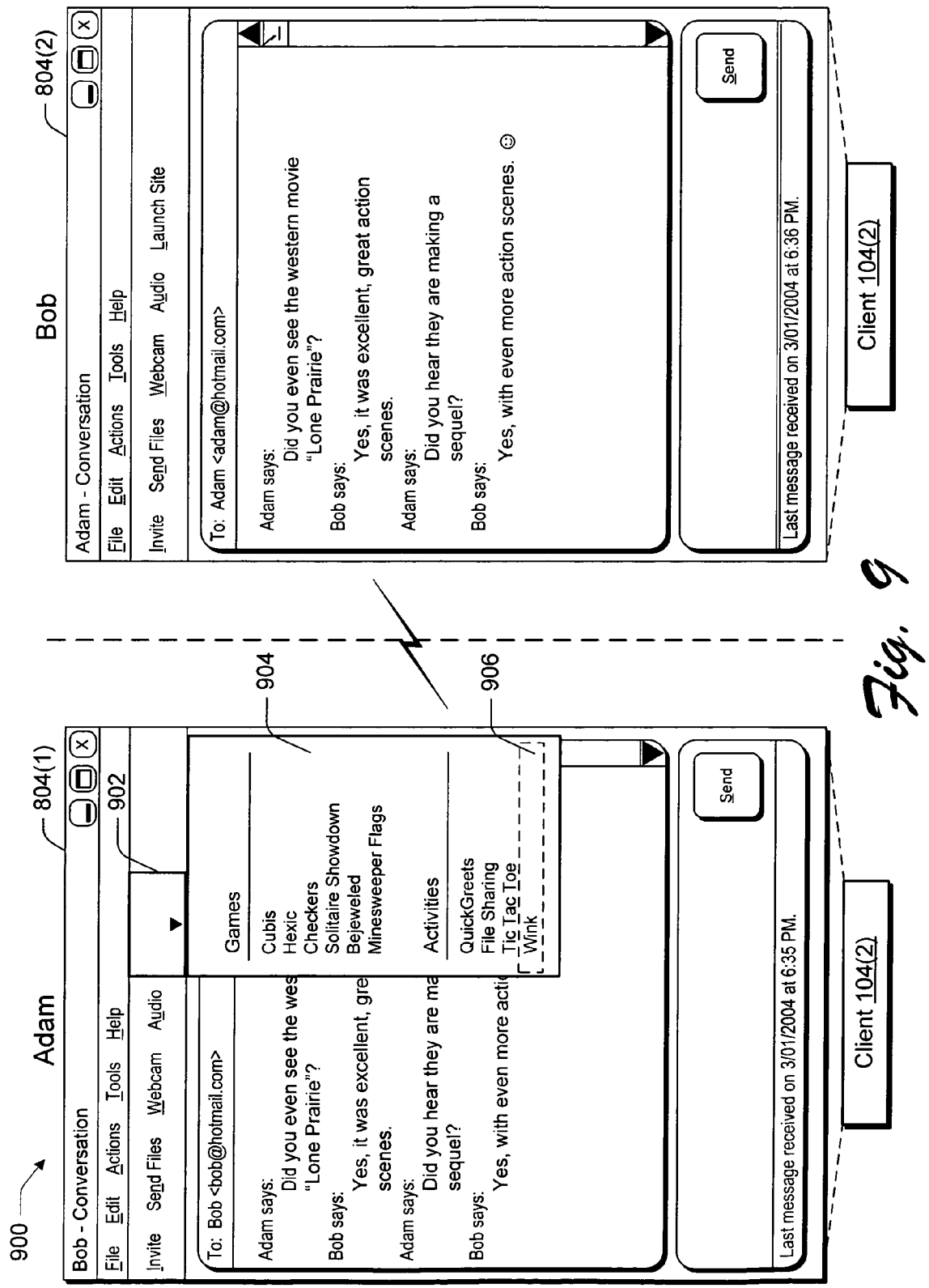
FIG. 9 illustrates an exemplary system in which the first client of FIG. 8 initiates output of a content item for the second client during the instant messaging session initiated in FIG. 8.

During the session, the first client 104(1) causes a particular item of content to be output by the second client 104(2) (block 704). FIG. 9 illustrates an exemplary system 900 in which the first client 104(1) of FIG. 8 initiates output of a content item for the second client 104(2) during the instant messaging session initiated in FIG. 8. In the illustrated instant messaging session, the first and second users have exchanged text messages which are displayed for viewing by the users in the respective user interfaces 804(1), 804(2). To initiate a content item illustrated as a "wink", the first user 802(1) (i.e., Adam) selects a launch site menu item 902, which causes a drop-down menu 904 of available activities to be displayed. The first user 802(1) selects a wink menu item 906, which causes content associated with the wink to be sent from the first client 104(1) to the second client 104(2). In an exemplary implementation, if the instant messaging session includes three or more individuals, the content may be sent to each of the client. In another exemplary implementation, the first user 802(1) may specify one or more particular instant messaging session participants to receive the content. Although the wink is shown as being initiated via a drop-down menu, the wink may be imitated in a variety of ways, such as through a keystroke combination, a button displayed in a menu bar, and so on.

Figure 10:
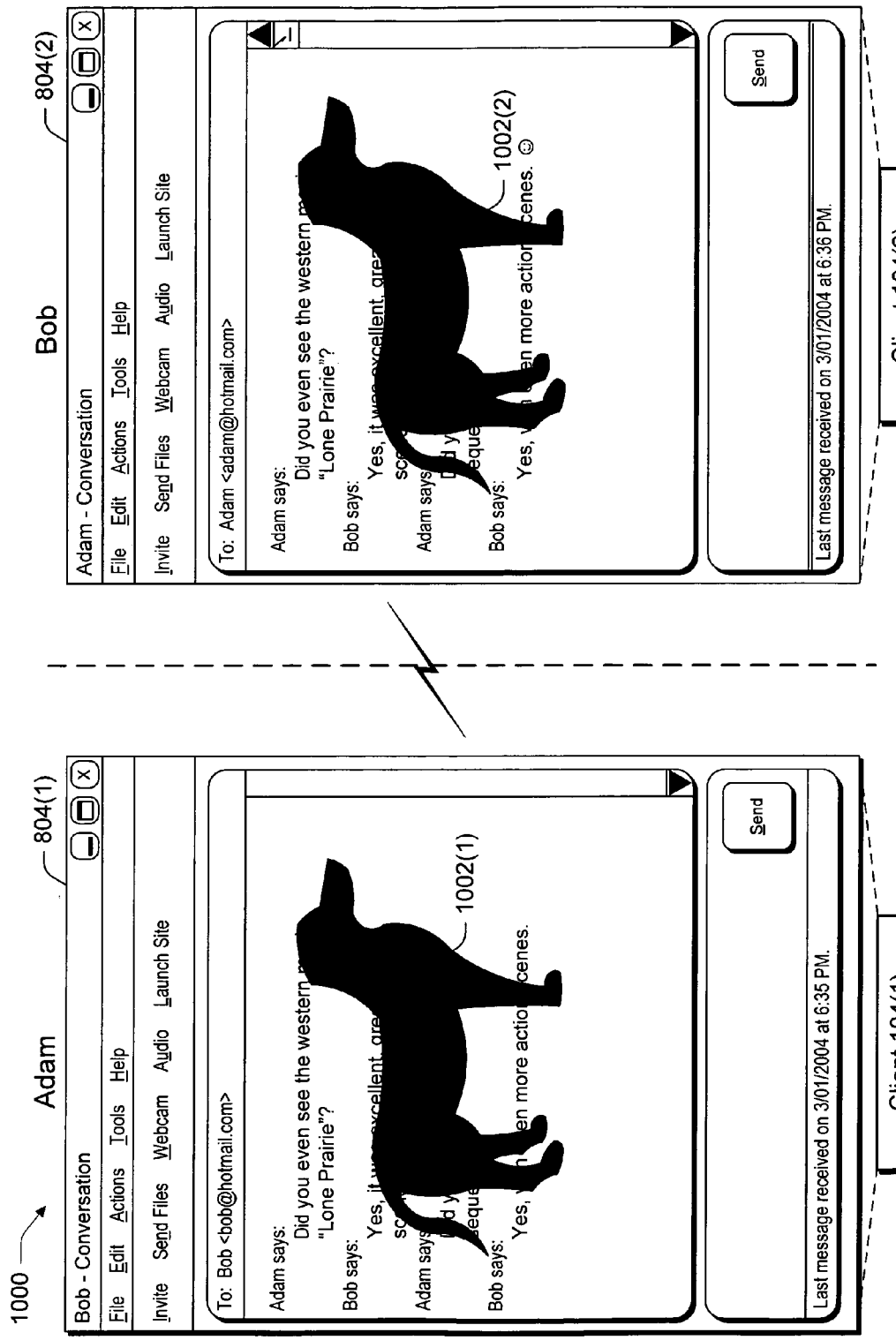
FIG. 10 is an illustration of a system in an exemplary implementation showing output of the content item that was initiated by the system of FIG. 9.

FIG. 10 is an illustration of a system 1000 in an exemplary implementation showing output of the wink that was initiated by the system 900 of FIG. 9. In this system 1000, the output of the wink is illustrated as an image of a dog 1002(1), 1002(2) for display in the respective user interfaces 804(1), 804(2). The image may be animated such that the dog 1002(1), 1002(2) appears to run across the respective user interfaces 804(1), 804(2) and dig through the displayed text used in the messaging session.

Upon viewing the output of the wink, the second user 802(2) may wish to acquire the wink for future output. Therefore, the second client selects the particular content item (e.g., the wink) (block 706). However, the wink may be configured for "one time" output. For example, the content which forms the wink may be communicated during the instant messaging session such that the second client 104(2) may only output the wink when initiated by the first client 104(1). Rather than force the second client 104(2) to manually locate the wink, however, the particular content item (e.g., the wink) may provide a display in the user interface 804(2) of how to obtain the particular content item (block 708).

Figure 11:
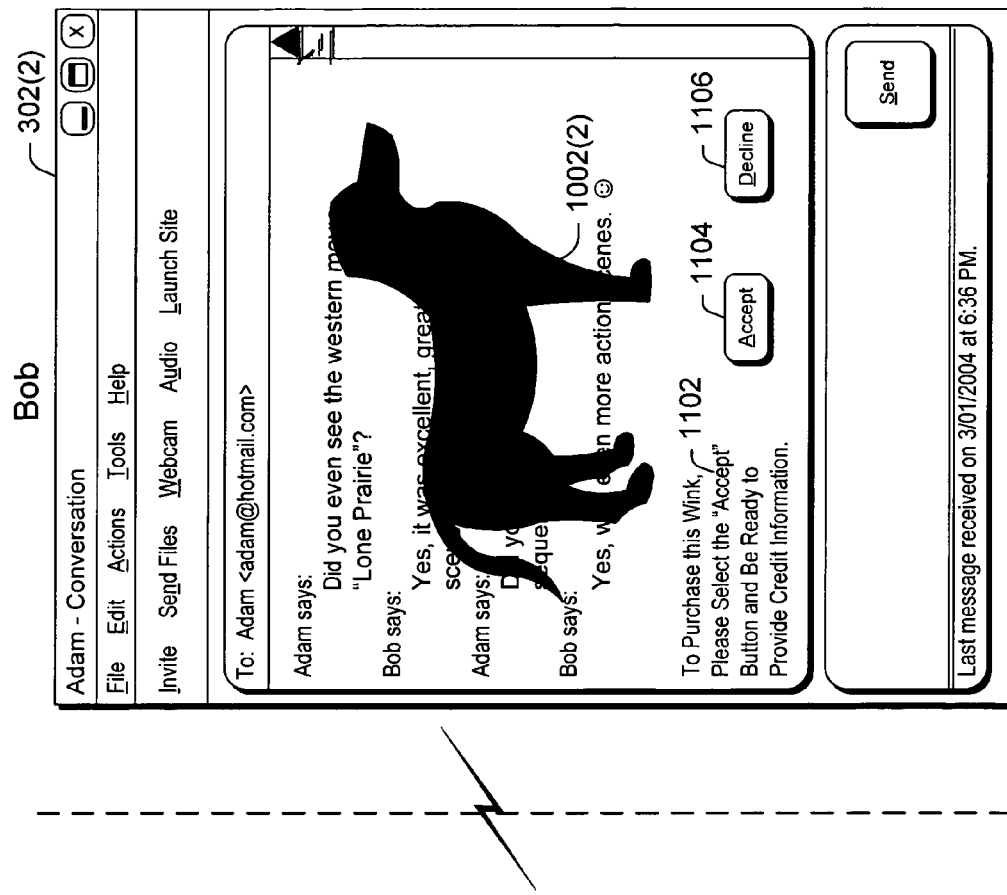
FIG. 11 is an illustration of a system showing a display of a message caused by selection of the output of the content item of FIG. 10, the display indicating how to obtain the output content.
Figure 11:
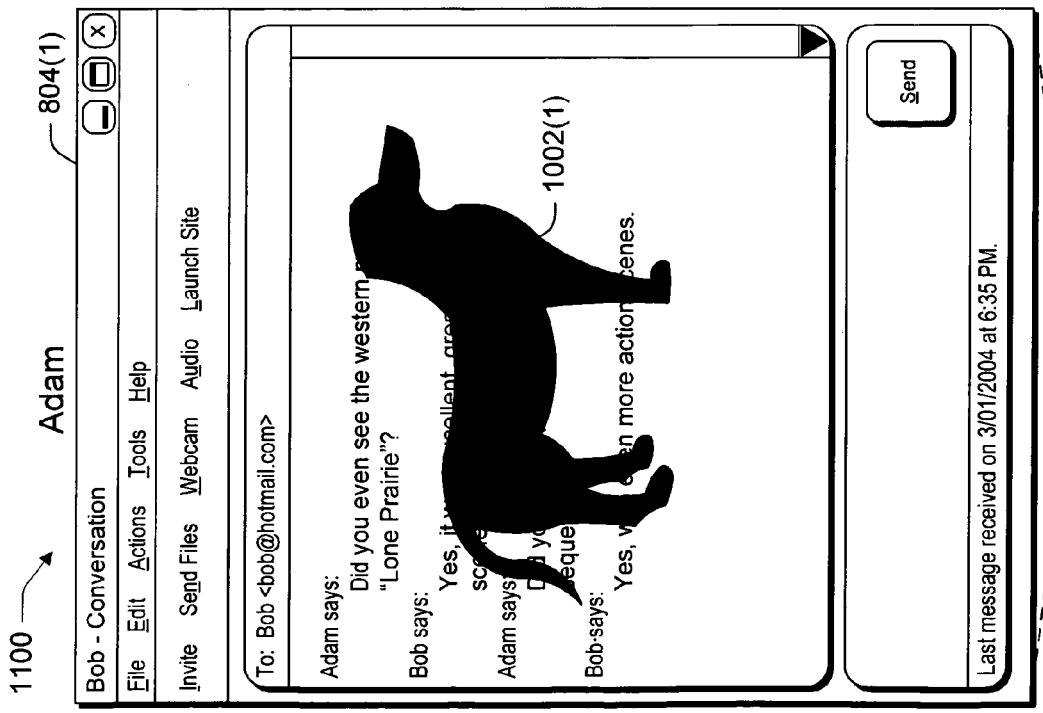

FIG. 11, for example, is an illustration of a system 1100 showing an output of a message 1102 for indicating to a user of the second client 104(2) of how to obtain the output content. The message 1102 in the illustrated system 1100 indicates that the particular content item (e.g., the dog wink) is available for purchase. The message 1102 also includes a display of an accept button 1104 and a decline button 1106. The accept button 1104 may include the functionality of a download link as previously described to cause automatic download of the particular content after the user has provided required information, which in this instance is payment information. Therefore, after the payment information is verified, the particular content item may be automatically installed in the messaging module of the client 104(2) as described in relation to FIG. 4. Thus, the provision of the payment information may act to initiate the automatic installation process for the particular content item (block 710).

Figure 12:
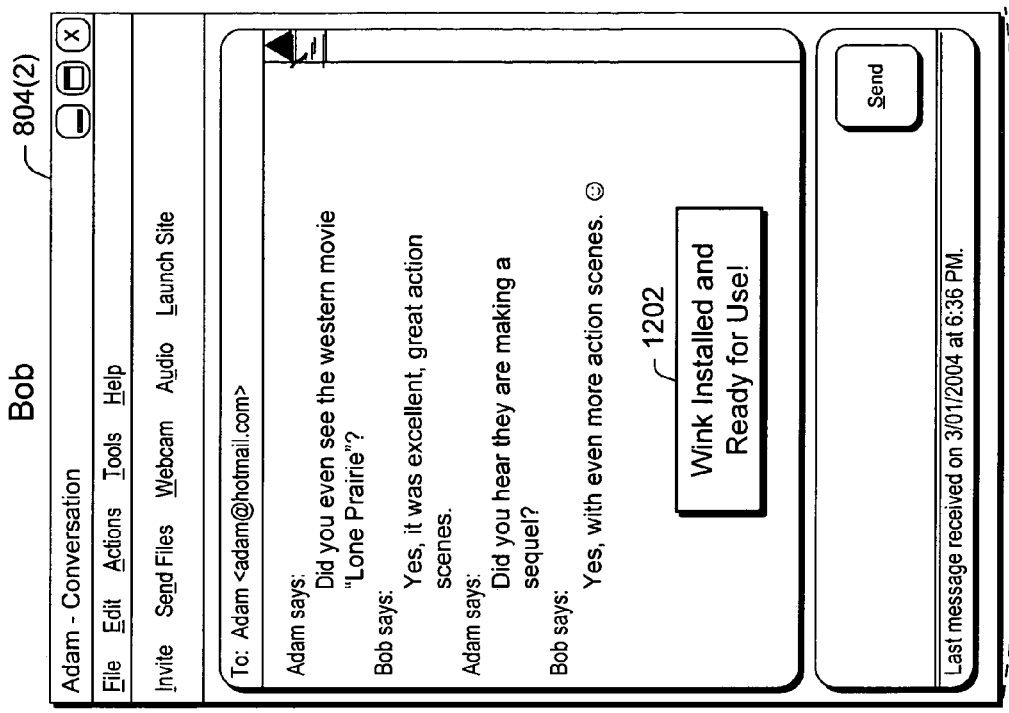
FIG. 12 is an illustration of a system showing an output of a message which indicates that the automatic installation of the particular content which was initiated using the system of FIG. 11 has been completed.
Figure 12:
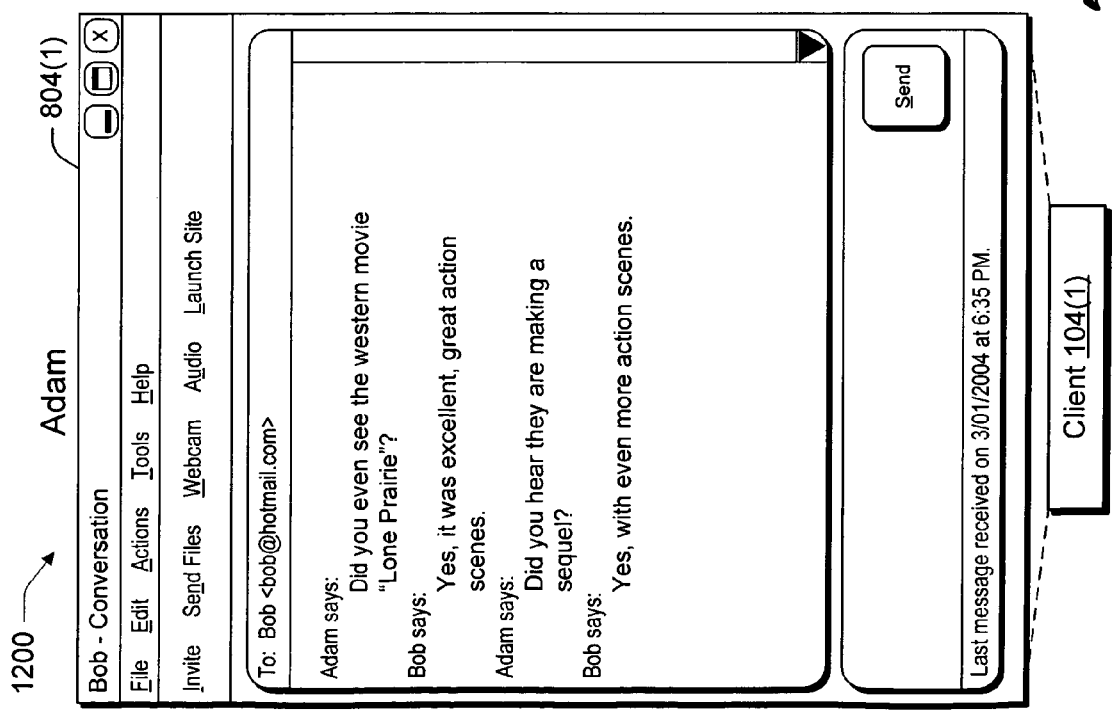

FIG. 12 is an illustration of a system 1200 showing an output of a message 1202 which indicates that the automatic installation of the particular content which was initiated utilizing the accept button 1104 of FIG. 11 has been completed. Therefore the application module of the client 104(2) is configured to utilize the installed content. For instance, the second client 104(2) may cause an output of the particular content (e.g., the wink) by another client, such as the first client 104(1).

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
  identifying, by a computing system configured to provide an instant messaging session, a content provider, the identifying comprising:
    navigating, by the computing system, to a website having a download link for one or more content items from the content provider;
    selecting, by the computing system, the download link associated with the content provider;
    communicating, by the computing system, a request to a list provider at a remote server to determine whether the content provider associated with the download link is trustworthy;
    obtaining, by the computing system, a result of whether the content provider is trustworthy, the result being determined by the list provider by comparing the download link with one or more download links in the trusted content provider list;
in an event that the content provider is trustworthy,
collecting, by the computing system, one or more content items from the content provider for output by a messaging module in the instant messaging session; and
forming, by the computing system, a content package that includes the one or more content items and a manifest which:
describes a content type for each said content item; and
is parseable for automatic installation of each said content item for use by a content manager module based on a respective said content type,
obtaining, by the computing system, the content package from over a network;
preventing, by the computing system, an unauthorized reuse of the one or more content items by a second content manager module;
providing, by the computing system, an option to authorize reuse of the one or more content items to the second content manager module, wherein the option to authorize reuse of the one or more content items comprises:
purchasing, by the computer system, authorization to reuse the one or more content items by the second content manager module;
installing, by the computing system, each said content item for use by the second content manager module; wherein:
the computing system comprises the content manager module and the second content manager module; and
the content manager module and the second content manager module are accessible by the content provider.

2. A method as described in claim 1, wherein the one or more content items are selected from the group consisting of:
a display picture;
a dynamic display picture;
a background picture;
an emoticon;
a wink;
a dynamic menu;
video content;
audio content; and
a theme.

3. A method as described in claim 1, further comprising providing the content package for distribution over a network to a client having the content manager module.

4. A method as described in claim 1, wherein the manifest conforms to an XML schema and each said content type is specified by a respective tag.

5. A system comprising:
one or more processors;
one or more computer-readable storage media storing instructions that when executed instruct the one or more processors to perform acts comprising:
identifying, by a first client computing system configured to provide an instant messaging session for a first client, a content item, wherein identifying the content item determines a content provider of the content item;
obtaining, by the first client computing system, a result of a comparison of the content provider to a trusted provider list, wherein:

the trusted provider list is collected from a reputation based system;
the reputation based system receives feedback from clients regarding interaction with the content provider; and
the trusted provider list is provided by a list provider at a remote server;
communicating, by the first client computing system, the content item from the first client to a second client;
outputting, by a second client computing system configured to provide an instant messaging session for the second client, the content item at the second client, wherein the content item is selectable during the outputting to initiate an automatic installation process of the content item such that the second client is configured to cause an output of the content item;
preventing, by the first client computing system, an unauthorized reuse of the content item by the second client; and
providing, by the second client computing system, options to purchase the content item.

6. A system as described in claim 5, wherein the content item is included in a content package.

7. A system as described in claim 5, wherein a content package includes one or more documents of where the content item is located.

8. A system as described in claim 5, the acts further comprising:
receiving, by the first client computing system, one or more inputs from a user for initiating an installation process of the content item; and
wherein at least one said input is confirmation that initiation of the installation process is desired.

9. A system as described in claim 5, the acts further comprising:
receiving, by the first client computing system, one or more inputs from a user for initiating an installation process of the content item; and
wherein at least one said input specifies selection of a download link or button on a web page for initiating the installation process.

10. A system as described in claim 5, the acts further comprising:
obtaining, by the first client computing system, a content package, from over a network, which includes a manifest that describes a content type for the content item;
wherein the manifest conforms to an XML schema and each said the content type is specified by a respective tag.

11. A system as described in claim 5, wherein the content item is selected from the group consisting of:
a display picture;
a dynamic display picture;
a background picture;
an emoticon;
a wink;
a dynamic menu;
video content;
audio content; and
a theme.

12. A method comprising during an instant messaging session:
identifying, by a first client computing system configured to provide an instant messaging session for a first client, a content item, wherein identifying the content item determines a content provider of the content item;

obtaining, by the first client computing system, a result of a comparison of the content provider to a trusted provider list, wherein:
- the trusted provider list is collected from a reputation based system;
- the reputation based system receives feedback from clients regarding interaction with the content provider; and
- the trusted provider list is provided by a list provider at a remote server;

communicating, by the first client computing system, the content item from the first client to a second client;

outputting, by a second client computing system configured to provide an instant messaging session for the second client, the content item at the second client, wherein the content item is selectable during the outputting to initiate an automatic installation process of the content item such that the second client is configured to cause an output of the content item;

preventing, by the first client computing system, an unauthorized reuse of the content item by the second client; and providing, by the second client computing system, options to purchase the content item.

13. A method as described in claim 12, wherein the content item is selected from the group consisting of:

a display picture;
a dynamic display picture;
a background picture;
an emoticon;
a wink;
a dynamic menu;
video content;
audio content; and
a theme.

14. A method as described in claim 12, wherein the automatic installation process of the content item includes:
- obtaining a content package, from over a network, which includes the content item and a manifest which describes a content type of the content item; and
- installing the content item for use by a computing system on the second client based on the content type.

15. A method as described in claim 12, wherein the manifest conforms to an XML schema and the content type is specified by a tag.

16. A method as described in claim 12, wherein the automatic installation process is performed after communication of payment information from the second client.

* * * * *